United States Patent
Britt

(10) Patent No.: US 9,507,365 B2
(45) Date of Patent: Nov. 29, 2016

(54) ADAPTIVE PID CONTROL SYSTEM FOR INDUSTRIAL TURBINES

(71) Applicant: Woodward, Inc., Fort Collins, CO (US)

(72) Inventor: Tena K. Britt, Loveland, CO (US)

(73) Assignee: Woodward, Inc., Fort Collins, CO (US)

(*) Notice: Subject to any disclaimer, the term of this patent is extended or adjusted under 35 U.S.C. 154(b) by 369 days.

(21) Appl. No.: 14/313,604

(22) Filed: Jun. 24, 2014

(65) Prior Publication Data

US 2015/0370277 A1  Dec. 24, 2015

(51) Int. Cl.
G05F 1/67 (2006.01)
G05B 15/02 (2006.01)
G05B 11/42 (2006.01)
G05B 13/02 (2006.01)

(52) U.S. Cl.
CPC .......... *G05F 1/67* (2013.01); *G05B 11/42* (2013.01); *G05B 13/024* (2013.01); *G05B 15/02* (2013.01)

(58) Field of Classification Search
CPC ......... G05F 1/67; G05B 15/02; G05B 13/02; G05B 11/42; G05B 11/36
USPC ............................................ 700/287, 37, 42
See application file for complete search history.

(56) References Cited

U.S. PATENT DOCUMENTS

| | | | |
|---|---|---|---|
| 5,103,629 A | | 4/1992 | Mumford et al. |
| 5,229,699 A | * | 7/1993 | Chu ................. G05B 11/42 318/610 |
| 5,252,860 A | | 10/1993 | McCarty et al. |
| 5,307,619 A | | 5/1994 | McCarty et al. |
| 5,394,322 A | * | 2/1995 | Hansen ............. G05B 13/045 700/32 |
| 5,553,589 A | * | 9/1996 | Middleton ......... F02D 31/007 123/352 |
| 5,805,447 A | * | 9/1998 | Teng ................. G05B 13/0235 700/28 |
| 5,971,579 A | * | 10/1999 | Kim ................. G05B 13/0265 700/37 |

(Continued)

FOREIGN PATENT DOCUMENTS

| | | |
|---|---|---|
| CN | 201574786 | 9/2010 |
| CN | 101963074 | 2/2011 |

(Continued)

OTHER PUBLICATIONS

Yarique et al "Particle Swarm Optimization (PSO) Based Turbine Control", May 2013, Scientific Research, pp. 126-137.*

(Continued)

*Primary Examiner* — Kenneth M Lo
*Assistant Examiner* — Olvin Lopez Alvarez
(74) *Attorney, Agent, or Firm* — Fish & Richardson P.C.

(57) ABSTRACT

The subject matter of this specification can be embodied in, among other things, a method that includes providing a process controller configured to perform a control algorithm based on at least one first control parameter, providing a parameter controller configured to perform a parameter adjustment algorithm, providing a turbine having an output sensor, providing to the process controller at least one first control parameter and a first input value, controlling the turbine based on the at least one first control parameter and the first input value, receiving a turbine response value provided by the turbine output sensor, determining at least one second control parameter based on the turbine response value and the parameter adjustment algorithm, providing, to the process controller from the parameter controller, the at least one second control parameter, and controlling the turbine based on the at the least one second control parameter and a second input value.

38 Claims, 9 Drawing Sheets

(56) References Cited

U.S. PATENT DOCUMENTS

| | | | |
|---|---|---|---|
| 6,055,459 A | 4/2000 | Lawrence | |
| 6,415,272 B1 | 7/2002 | Ulyanov | |
| 6,480,750 B2* | 11/2002 | Junk | G05B 13/024 |
| | | | 700/289 |
| 6,546,295 B1* | 4/2003 | Pyotsia | G05B 13/024 |
| | | | 318/561 |
| 6,577,908 B1 | 6/2003 | Wojsznis et al. | |
| 6,591,808 B2 | 7/2003 | Lin et al. | |
| 6,796,129 B2 | 9/2004 | Yee et al. | |
| 7,284,375 B2 | 10/2007 | Butscher et al. | |
| 7,610,745 B2 | 11/2009 | Fujii et al. | |
| 7,685,802 B2 | 3/2010 | Feiz | |
| 7,809,668 B1* | 10/2010 | Smith | G05B 13/0275 |
| | | | 700/42 |
| 7,822,512 B2 | 10/2010 | Thatcher et al. | |
| 8,025,476 B2 | 9/2011 | Zheng et al. | |
| 8,260,441 B2 | 9/2012 | ScheegaB et al. | |
| 8,437,941 B2 | 5/2013 | Chandler | |
| 8,499,561 B2 | 8/2013 | Kluge et al. | |
| 2002/0040250 A1* | 4/2002 | Gaikwad | G05B 11/42 |
| | | | 700/37 |
| 2003/0091429 A1* | 5/2003 | Staroselsky | F01D 17/26 |
| | | | 415/1 |
| 2003/0093184 A1* | 5/2003 | Tanaka | F02C 9/28 |
| | | | 700/289 |
| 2003/0173291 A1* | 9/2003 | Schimel | C02F 3/006 |
| | | | 210/603 |
| 2004/0119293 A1* | 6/2004 | McKelvey | F01D 15/10 |
| | | | 290/52 |
| 2006/0241787 A1* | 10/2006 | Tanaka | G05B 17/02 |
| | | | 700/30 |
| 2007/0073422 A1* | 3/2007 | Gaikwad | G05B 13/024 |
| | | | 700/37 |
| 2007/0199330 A1 | 8/2007 | West et al. | |
| 2007/0204625 A1 | 9/2007 | Thatcher et al. | |
| 2008/0065257 A1* | 3/2008 | He | B23Q 17/09 |
| | | | 700/175 |
| 2008/0159411 A1 | 7/2008 | Ayala | |
| 2009/0132064 A1* | 5/2009 | Ydstie | G05B 13/048 |
| | | | 700/42 |
| 2009/0319060 A1* | 12/2009 | Wojsznis | G05B 11/42 |
| | | | 700/30 |
| 2011/0004356 A1* | 1/2011 | Garcia | F03D 7/0284 |
| | | | 700/287 |
| 2011/0270451 A1 | 11/2011 | Sakaguchi et al. | |
| 2011/0301724 A1* | 12/2011 | Tondolo | G05B 11/42 |
| | | | 700/42 |
| 2012/0023960 A1 | 2/2012 | Minto | |
| 2012/0215326 A1* | 8/2012 | Brown | G05B 11/42 |
| | | | 700/42 |
| 2015/0114320 A1* | 4/2015 | Beveridge | F22G 5/00 |
| | | | 122/479.1 |

FOREIGN PATENT DOCUMENTS

| | | |
|---|---|---|
| CN | 102588011 | 7/2012 |
| CN | 202483642 | 10/2012 |
| CN | 102953775 | 3/2013 |
| CN | 102994672 | 3/2013 |
| CN | 203285493 | 11/2013 |
| CN | 203285494 | 11/2013 |
| DE | 19950304 | 5/2001 |
| EP | 0786708 | 7/1997 |
| EP | 1312765 B1 | 1/2008 |
| JP | 2003172154 | 6/2003 |
| KR | 100931769 | 3/2009 |
| RU | 2418964 | 5/2011 |
| WO | WO 2004/005675 | 1/2004 |
| WO | WO 2013/034420 | 3/2013 |

OTHER PUBLICATIONS

Yukitomo et al, "A new PID controller tuning system and its application to a flue gas temperature control in a gas turbine power plant", Sep. 1998, IEEE, pp. 1373-1377.*

PCT International Search Report and Written Opinion of the International Searching Authority, PCT/US2015/036948, Sep. 24, 2015, 11 pages.

* cited by examiner

ADAPTIVE PID CONTROL SYSTEM FOR INDUSTRIAL TURBINES

TECHNICAL FIELD

This specification relates to controlling industrial turbines.

BACKGROUND

A turbine is a rotary mechanical device that converts energy from a fluid flow to work, such as by providing thrust or rotary mechanical power. A turbine is a turbomachine with at least one moving part called a rotor assembly, which is a shaft or drum onto which blades attached. Moving fluid acts on the blades so that they move and impart rotational energy to the rotor.

A proportional-integral-derivative (PID) controller is a control loop feedback system that is widely used in industrial control systems. A PID controller determines the difference between a measured process variable and a desired setpoint and calculates an error value. The PID controller adjusts process control outputs to reduce the error value.

Tuning of PID controllers can be a difficult task, especially in applications such as turbine control where multiple, possibly conflicting, performance objectives such as fast transient response and high stability of the turbine output are desired. Tuning of PID controllers can also be a difficult when the turbine is unloaded, since unloaded turbines are systems with little damping and high acceleration, which are unusual conditions within the process control industry. In practice, such applications can exceed the skills or training of turbine operations personnel, and PID tuning configurations are often adjusted repeatedly through trial-and-error until the system provides an acceptable, but not always optimal, level of performance.

SUMMARY

In general, this document describes controlling industrial turbines.

In a first aspect, a method for operating a turbine includes providing a process controller configured to perform a control algorithm based on at least one first control parameter representing a first value selected from a group comprising a proportional gain (P) value, an integral gain (I) value, and a derivative gain (D) value, providing a parameter controller configured to perform a parameter adjustment algorithm, providing a turbine having assembled thereto a turbine output sensor in communication with the process controller and the parameter controller, providing, to the process controller, at least one first control parameter and a first input value, controlling, by the process controller, the turbine based on the at least one first control parameter and the first input value, receiving, by the parameter controller, a turbine response value provided by the turbine output sensor, determining, by the parameter controller, at least one second control parameter based on the turbine response value and the parameter adjustment algorithm, the second control parameter representing a second value selected from the group, providing, to the process controller from the parameter controller, the at least one second control parameter, and controlling, by the process controller, the turbine based on the at the least one second control parameter and a second input value.

Various implementations can include some, all, or none of the following features. The control algorithm can be given by the equation: $H(s)=P(1-I/s)(Ds+1)$. The method can also include identifying, by the parameter controller, the turbine response value provided by the turbine output sensor. At least one of the first input value and the second input value can be a value selected from the group consisting of turbine speed, load, temperature, flow, current, voltage, pressure, and vibration. The P value can be a function of a relative system gain, a relative system deadtime, and a response speed input parameter. At least one of the I value and the D value can be a function of a measured system response frequency, a relative system gain, a relative system deadtime, and a response speed input parameter.

In a second aspect, a method for operating a turbine includes receiving, at a parameter controller, a turbine response value, the turbine response value based on an input value and at least one first control parameter and an input value representing a first value selected from a group comprising a proportional gain (P) value, an integral gain (I) value, and a derivative gain (D) value, determining, by the parameter controller, at least one second control parameter based on the turbine response value and a parameter adjustment algorithm, the second control parameter representing a second value selected from the group, and providing, by the parameter controller, the at least one second control parameter.

Various implementations can include some, all or none of the following features. The method can include providing a parameter controller configured to perform the parameter adjustment algorithm. The method can include providing a turbine having assembled thereto a turbine output sensor configured to provide the turbine response value. The method can also include providing a PID controller configured to perform a control algorithm based on at least one first control parameter. The at least one first control parameter, the at least one second control parameter, and the input value can be PID controller values. The process controller can be configured to perform a control algorithm given by the equation: $H(s)=P(1+I/s)(Ds+1)$. The turbine response value can include one or more turbine output values provided by a turbine output sensor. The turbine response value can be based on an output response of a turbine under the control of a process controller configured with the at least one first control parameter and the input value. The method can also include identifying, by the parameter controller, the turbine response value provided by a turbine output sensor. The input value can be a value selected from the group consisting of turbine speed, load, temperature, flow, current, voltage, pressure, and vibration. The P value can be a function of a relative system gain, a relative system deadtime, and a response speed input parameter. At least one of the I value and the D value can be a function of a measured system response frequency, a relative system gain, a relative system deadtime, and a response speed input parameter.

In a third aspect, a turbine parameter controller includes an input, an output, memory storing instructions that are executable, and one or more processing devices to execute the instructions to perform operations including receiving a turbine response value at the input, the turbine response value based on an input value and at least one first control parameter representing a first value selected from a group comprising a proportional gain (P) value, an integral gain (I) value, and a derivative gain (D) value, determining at least one second control parameter based on the turbine response value and a parameter adjustment algorithm, the second control parameter representing a second value selected from the group, and providing the at least one second control parameter at the output.

Various implementations can include some, all, or none of the following features. The at least one first control parameter, the at least one second control parameter and the input value can be PID controller values. The at least on second control parameter can be provided to a PID controller configured to perform a control algorithm given by the equation: $H(s)=P(1+I/s)(Ds+1)$. The turbine response value can include one or more turbine output values provided by a turbine output sensor. The turbine response value can be based on an output response of a turbine under the control of the process controller configured with the at least one first control parameter and the input value. The controller can also include identifying the turbine response value provided by a turbine output sensor. The input value can be a value selected from the group comprising: turbine speed, load, temperature, flow, current, voltage, pressure, and vibration. The P value can be a function of a relative system gain, a relative system deadtime, and a response speed input parameter. At least one of the I value and the D value can be a function of a measured system response frequency, a relative system gain, a relative system deadtime, and a response speed input parameter.

In a fourth aspect, a turbine system includes a process controller configured to perform a control algorithm based on at least one first control parameter representing a first value selected from a group comprising a proportional gain (P) value, an integral gain (I) value, and a derivative gain (D) value, a parameter controller configured to perform a parameter adjustment algorithm, a turbine having assembled thereto a turbine output sensor in communication with the process controller and the parameter controller, wherein the parameter adjustment algorithm is configured to perform operations including providing, to the process controller, at least one first control parameter and a first input value, controlling, by the process controller, the turbine based on the at least one first control parameter and the first input value, receiving, by the parameter controller, a turbine response value provided by the turbine output sensor, determining, by the parameter controller, at least one second control parameter based on the turbine response value and the parameter adjustment algorithm, the second control parameter representing a second value selected from the group, providing, to the process controller from the parameter controller, the at least one second control parameter, and controlling, by the process controller, the turbine based on the at least one second control parameter and a second input value.

Various implementations can include some, all, or none of the following features. The control algorithm can be given by the equation: $H(s)=P(1+I/s)(Ds+1)$. The operations can include identifying, by the parameter controller, the turbine response value provided by the turbine output sensor. At least one of the first input value and the second input value can be a value selected from the group comprising: turbine speed, load, temperature, flow, current, voltage, pressure, and vibration. The P value can be a function of a relative system gain, a relative system deadtime, and a response speed input parameter. At least one of the I value and the D value can be a function of a measured system response frequency, a relative system gain, a relative system deadtime, and a response speed input parameter.

In a fifth aspect, a computer readable medium storing instructions that, when executed by one or more processors, cause the one or more processors to perform operations including receiving, at a parameter controller, a turbine response value, the turbine response value based on an input value and at least one first control parameter representing a first value selected from a group comprising a proportional gain (P) value, an integral gain (I) value, and a derivative gain (D) value, determining, by the parameter controller, at least one second control parameter based on the turbine response value and a parameter adjustment algorithm, the second control parameter representing a second value selected from the group, and providing, by the parameter controller, the at least one second control parameter.

Various implementations can include some, all, or none of the following features. A parameter controller can be provided and configured to perform the parameter adjustment algorithm. A turbine can be provided, having assembled thereto a turbine output sensor configured to provide the turbine response value. A process controller can be provided, and configured to perform a control algorithm based on at least one first control parameter. The at least one first control parameter, the at least one second control parameter, and the input value can be PID controller values. The process controller can be configured to perform a control algorithm given by the equation: $H(s)=P(1+I/s)(Ds+1)$. The turbine response value can include one or more turbine output values provided by a turbine output sensor. The turbine response value can be based on an output response of a turbine under the control of the process controller configured with the at least one first control parameter and the input value. The operations can also include identifying, by the parameter controller, the turbine response value provided by a turbine output sensor. The input value can be a value selected from the group consisting of turbine speed, load, temperature, flow, current, voltage, pressure, and vibration. The P value can be a function of a relative system gain, a relative system deadtime, and a response speed input parameter. At least one of the I value and the D value can be a function of a measured system response frequency, a relative system gain, a relative system deadtime, and a response speed input parameter.

The systems and techniques described here may provide one or more of the following advantages. First, a system can provide for automated adjustment of proportional, integral, and derivative gain parameters of a process controller to achieve a predetermined operation of a turbine. Second, the system can provide offline speed control of a gas turbine. Third, the system can provide load control of a gas or steam turbine, utilizing speed droop. Fourth, the system can provide load control of a gas or steam turbine, utilizing load droop. Fifth, the system can provide offline speed control of a steam turbine pulling a vacuum. Sixth, the system can provide extraction control of a steam turbine.

The details of one or more implementations are set forth in the accompanying drawings and the description below. Other features and advantages will be apparent from the description and drawings, and from the claims.

DETAILED DESCRIPTION

This document describes systems and techniques for controlling industrial turbines. Industrial turbines can be controlled using proportional (P), proportional-integral (PI), and proportional-integral-derivative (PID) controllers. Tuning P, PI, and PID controllers, however, can be a challenge. For example, because industrial turbines can present demanding control challenges, and/or because the dynamic behavior of industrial turbines may not be an obvious or intuitive subject for some turbine operators.

Figure 1:
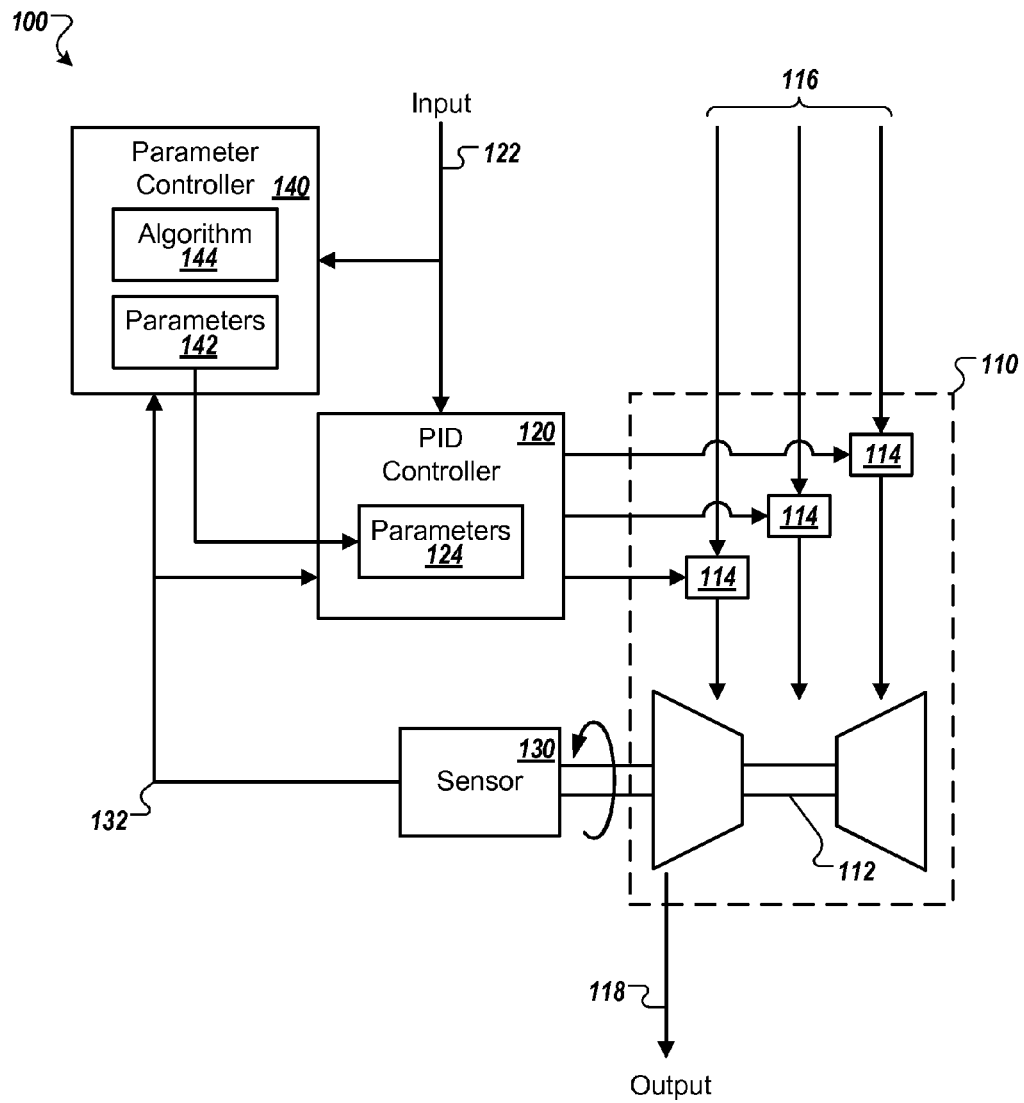
FIG. 1 is a schematic diagram that shows an example of an industrial turbine control system.

FIG. 1 is a schematic diagram that shows an example of an industrial turbine control system 100. A turbine assembly 110 includes a turbine 112, and a collection of one or more controllable inputs 114 for controlling the flow of a collection of one or more fluid or steam supplies 116 to the turbine 112. By controllably adjusting the controllable inputs 114 to control the flows of the steam/fluid supplies 116 to the turbine 112, the rotational speed, load, acceleration, deceleration, and other performance parameters of the turbine 112 can be controllably adjusted.

In some embodiments, the turbine 112 can be a gas turbine or other form of combustion-driven turbine. In such embodiments, the controllable inputs 114 can include pumps, valves, injectors, and combinations of these and other devices for controlling the flows of the fluid supplies 116 such as gasses (e.g., natural gas, hydrogen, oxygen, propane, methane, air) and/or liquids (e.g., fuel, water) to the turbine 112. In some embodiments, the turbine 112 can be a steam turbine. In such embodiments, the controllable inputs 114 can include pumps, valves, injectors, and combinations of these and other devices for controlling the flow of the fluid supply 116, in the form of steam, to the turbine 112.

In the example system shown in FIG. 1, the controllable inputs 114 are adjusted by a proportional-integral-derivative (PID) controller 120. The PID controller 120 adjusts the controllable inputs 114 based on an input parameter 122 (e.g., desired turbine speed), a feedback signal 132 provided by a sensor 130 configured to sense an output 118 of the turbine 112, and a collection of control parameters 124 in a closed-loop feedback control system. In some embodiments, the sensor 130 can be a speed sensor configured to sense the rotational speed of the turbine 112, and provide a speed signal as the feedback signal 132 to the PID controller 120. In some embodiments, the sensor 130 can be a temperature, pressure, vibration, or any other appropriate sensor that can be used to sense a parameter of the turbine assembly 110 and provide the feedback signal 132 in response to the sensed parameter. In some embodiments, the PID controller 120 can be a P controller or a PI controller, or the PID controller 120 can be configured as a PI or P controller (e.g., by setting D and/or I gains to zero).

The performance of the turbine assembly 110 is evaluated as a comparison between how rapidly and/or accurately the feedback signal 132 tracks the input parameter 122. For example, the input parameter 122 can be a desired speed setting, and the control parameters 124 can affect how closely the speed of the turbine 112 matches a desired steady-state speed, and/or the control parameters 124 can affect how closely the speed of the turbine 112 is able to change to meet a newly established desired speed within a predetermined amount of time (e.g., an overdamped response) and within a predetermined amount of speed overshoot (e.g., an underdamped response). Examples of overdamped and underdamped responses are discussed further in connection with the descriptions of FIGS. 7 and 8.

In the example system shown in FIG. 1, the input parameter 122 and the feedback signal 132 are also provided to a parameter controller 140. The parameter controller 140 compares the input parameter 122 to the feedback signal 132 to determine a set of control parameters 142. The parameter controller 140 can also generate a disturbance parameter and provide it as the input parameter 122 to the PID controller 120, or control the output of the PID directly, and analyze the response of the turbine 112 through the feedback signal 132. For example, the parameter controller 140 can change a desired speed from a first desired speed to a second desired speed as a step function, and can monitor the output of a speed sensor to analyze how accurately and quickly the turbine assembly 110 responds. The parameter controller 140 can also adjust the actuator directly, and analyze the system.

By comparing the input parameter 122 to the feedback signal 132, the parameter controller 140 can execute a parameter adjustment algorithm 144 to determine a set of control parameters 142. The parameter controller 140 provides the control parameters 142 to the PID controller 120 for use as the control parameters 124, for controlling the turbine assembly 110.

In some embodiments, the system 100 can provide load control of a gas or steam turbine utilizing speed droop. In some embodiments, the system 100 can provide load control of a gas or steam turbine utilizing load droop. For example, droop control can allow individual generators to share system load changes in proportion to their maximum output rating. For example, in electricity generation, droop speed control can be a primary instantaneous system using net frequency deviations to stably distribute load changes over multiple turbine-driven generators.

Figure 2:
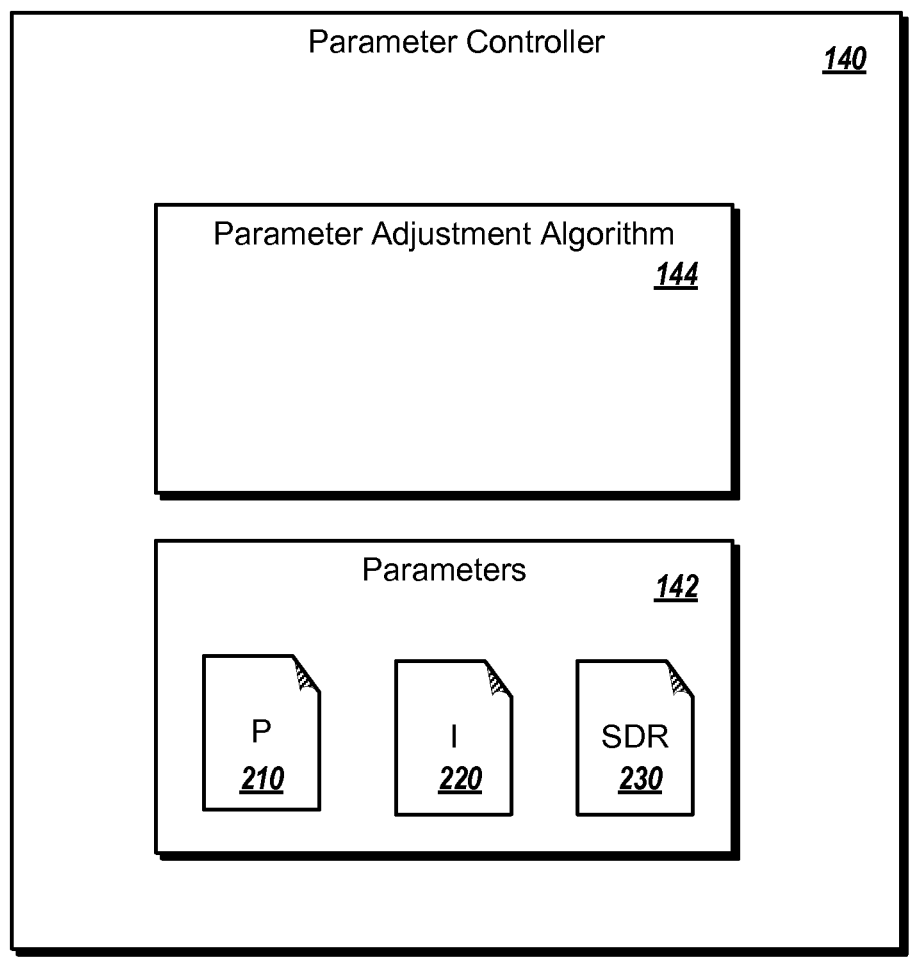
FIG. 2 is a block diagram that shows an example of a parameter controller.

FIG. 2 is a block diagram that shows an example of the parameter controller 140 of FIG. 1. The parameter controller 140 includes the control parameters 142 and the parameter adjustment algorithm 144. Included among the control parameters 142 are a proportional (P) gain parameter 210, an integral (I) gain parameter 220, and a derivative gain parameter (D). For user input purposes, rather than derivative, an input for a speed derivative ratio (SDR) gain parameter 230, is provided. The SDR parameter is converted to the derivative parameter by the parameter controller 140 and/or the PID controller 120. A generic form of the parallel PID controller transfer function used by the PID controller 120 is given by the equation:

$$H(s) = P\left(1 + \frac{I}{S}\right)(Ds + 1)$$

The PID controller 120 uses the form shown above, however rather than exposing the derivative term (D) to the user, the PID controller 120 allows the user to adjust the Speed Derivative Ratio, or SDR. In some implementations, the SDR parameter can simplify the task of turbine configuration, while leaving the fundamental PID structure substantially unchanged, and allows the PID algorithm to use values for the P, I, and D gain parameters.

The SDR parameter 230 is a combination of I and D. In some implementations, use of the SDR parameter 230 can make tuning of the PID controller 120 easier for turbine operators or other users. The user selects the SDR value to indicate whether input or feedback dominant behavior is desired. For examples in which the value of the SDR parameter 230 is greater than 1, but less than 100, the system is considered as being "feedback dominant", and the equation representing the output of the PID controller 120 is:

$$Out = \frac{1}{\left(\frac{1}{I}\right)s+1}\text{Feedback} + \frac{\left(\frac{1}{SDR \cdot I}\right)s+1}{\left(\frac{0.2}{SDR \cdot I}\right)s+1} P \cdot \text{error, and } D = SDR/I$$

In the foregoing equation, "error" represents the error between the setpoint and the process inputs, and "Out" represents the output of the PID function, which is typically the demand to the actuator.

In feedback dominant mode, the I term is implemented in the integrator feedback, and the control will be less sensitive to input noise. In some implementations, this mode can be useful for parameters which are mostly influenced by fuel demand, because the PID controller 120 can limit the fuel demand of other modes of control even if the setpoint of the PID controller 120 has not been exceeded. In some implementations, temperature controls can use this mode because temperature feedback is generally not fast enough to prevent an over-temperature condition even when extra derivative gain is provided in the input.

For examples in which the value of the SDR parameter 230 is equal or less than 1, but greater than 0.01, the system is considered as being "input dominant", and the equation representing the output of the PID controller 120 is:

$$Out = \frac{1}{\left(\frac{SDR}{I}\right)s+1}\text{Feedback} + \frac{\left(\frac{1}{I}\right)s+1}{\left(\frac{0.2 \cdot SDR}{I}\right)s+1} SDR \cdot P \cdot \text{error},$$

and $D = 1/(SDR \cdot I)$

Input dominant systems implement the I term before the integrator, therefore the error term will have a large derivative added to the input. This configuration causes the PID controller 120 to take corrective action before reaching the setpoint. In some implementations, this mode can be used when the parameter being controlled is influenced by an external disturbance. The "input dominant" mode responds well to external disturbances, but has an increased sensitivity to noise coming in with the controlled parameter. Again, in the present example, "error" represents setpoint feedback error, and "Out" represents the output of the PID function.

For examples in which the value of the SDR parameter 230 is equal to 100, the inlet filter for this case has substantially no effect. For examples where SDR is equal to 0.01 (e.g., the minimum value), D=1/I equals the T term and the inlet filter has substantially no effect. In both of these cases, the PID controller 120 operates as a PI controller. The parameter controller 140 uses the parameter adjustment algorithm 144 to determine the P and I, or P, I, and SDR values, and provides them to the PID controller 120 for use as the control parameters 124.

While the transfer function for the input dominant mode and the feedback dominant mode is substantially the same, the difference between the two modes will be exhibited when the controlled system comes into control from an out of control situation. The selection of the "input dominant" or "feedback dominant" mode is selected by the user, and has substantially no effect on a single PID control, has substantially no effect on a multiple PID control in which one PID is in control, and has substantially no effect on the parameter controller functionality. For the purposes of the examples discussed here, it does not matter whether the system is input or feedback dominant. The two equations for "Out" in the paragraphs above are the same, except when the PID controller 120 is coming into or out of control. As a result, the equation below can be used for further discussions, without loss of accuracy.

$$H(s) = P\left(1 + \frac{I}{S}\right)(Ds + 1)$$

For the purpose of the following discussion, it does matter if the control is a PI or PID controller, as the gains are calculated differently. In some implementations, nominal values for P, I, and D may vary from system to system. For example, P may vary inversely with the input variable scaling and range, and I and D may vary with the response of the system being controlled. As discussed previously, D is a function of SDR. P, I, and SDR vary with the desired response by the user. For example, some control loops may require very fast response, while other control loops may not tolerate overshoot well and should be configured to provide more margin.

Figure 3:
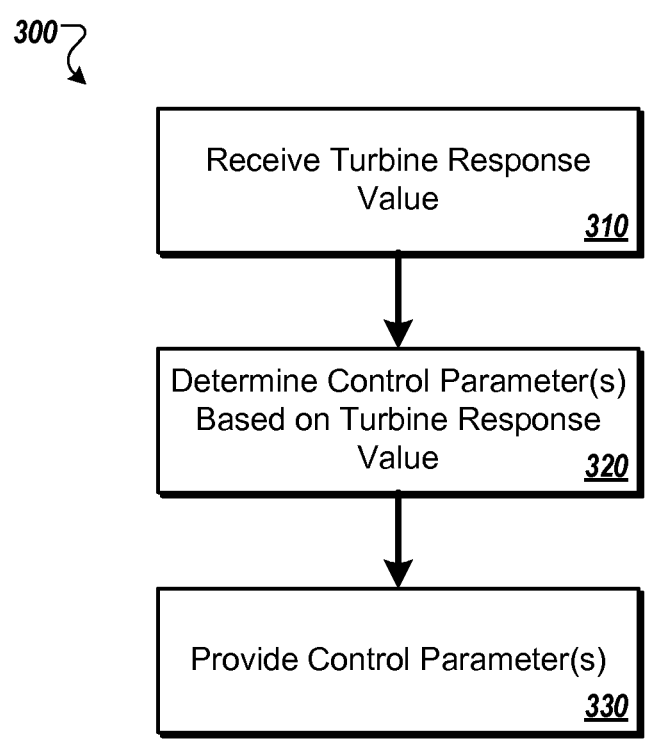
FIG. 3 is flow chart that shows an example of a process for determining PID control parameters.

FIG. 3 is flow chart that shows an example of a process 300 for determining PID control parameters. In some implementations, process 300 can be performed by the parameter controller 140 of the example systems 100 shown in FIG. 1.

At 310 a turbine response value is received. The turbine response value is based on at least one first control parameter and an input value. For example, the feedback signal 132 is received at the parameter controller 140. The feedback signal 132 provides information about an output of the turbine assembly 110, such as turbine speed, turbine load, outlet temperature, flow, current, voltage, inlet pressure, outlet pressure, extraction pressure, or vibration that is generated by the turbine 112, which is controlled by the PID controller 120 based on the input parameter 122 and the control parameters 124.

At 320, at least one second control parameter determined based on the turbine response value and a parameter adjustment algorithm. For example, the parameter controller 140 can execute the parameter adjustment algorithm 144 to determine the P gain parameter 210, the I gain parameter 220, and/or the SDR parameter 230.

The parameter adjustment algorithm may have five inputs or handles that the user can adjust. The user can adjust the desired speed of the response by configuring a "FAST_SLOW" input parameter. The user can select P, PI, or PID control, by configuring a "P_PI_PID input" parameter. The user can select the desired allowable actuator movement limit by configuring an "ACT_MV_LMT" input parameter. The user can also select the desired allowable process movement by configuring a "PRC_MV_LMT" input parameter, and the allowable droop process movement by configuring a "DRP_MV_LMT" input parameter.

The parameter adjustment algorithm operates substantially synchronously with the PID controller 120, at substantially the same recursion rate as the PID controller 120, and with inputs and outputs which are substantially synchronized to the PID controller 120. When enabled, the parameter adjustment algorithm initially controls the actuator directly, and observes the turbine response. The actuator moves up and down, within the ACT_MV_LMT and PRC_MV_LMT parameters, based on the process response. When the process moves up, the actuator moves down, and vice versa. From the process response, the system gain, the system response frequency, and the relative system deadtime are observed.

The system gain is a ratio of the amount of process movement change to the amount of actuator movement change. The system gain can be calculated by measuring the amplitude of the actuator movement, measuring the amplitude of the process movement, and dividing them. By definition of a closed loop, the P value should be a fraction of the inverse of the system gain. If the P value, multiplied by the system gain, is greater than 1 then the loop will be unstable because the loop gain will be greater than 1. The amount of process movement and frequency of process movement is varied during the test, and the system gain is calculated for each variation. This relative system gain is the ratio of the system gain for high frequency/low amplitude changes, to the system gain for low frequency/high amplitude changes.

The system response frequency is the frequency at which the system responds to actuator changes. The system frequency can be calculated by measuring the period of the turbine response, and inverting it. By definition of a closed loop, the I value is generally configured to be a fraction of the system response frequency, and the D value is generally configured to be a fraction of the inverse of the system response frequency. If the I value exceeds the system response frequency, or the D value exceeds the inverse of the system response frequency, the system will be unstable, because the control will request faster movement than the turbine system can provide.

The system deadtime is the elapsed time between an actuator movement change from steady state until the beginning of a process movement change. The relative system deadtime is the ratio of the system deadtime, to the system response frequency.

The new P, I, and D values are calculated based on the system gain, relative system gain, system response frequency and relative system deadtime parameters, and on the FAST_SLOW input, as well as the P_PI_PID input. There are many tuning algorithms which use system gain and system response as inputs, such as the Ziegler-Nichols algorithm. There are also algorithms which use system gain, system response, and system deadtime as inputs, such as the Cohen-Coon algorithm. Both of these algorithms are referenced in multiple publications, and in various implementations, each algorithm can have its own comparative advantages and disadvantages. For example, the Ziegler-Nichols and related algorithms may be selected for use in systems with minimal deadtime, but may not always work well for systems with significant deadtime, and can be too aggressive for some systems. In another example, the Cohen-Coon and similar algorithms may be selected for use in systems with significant deadtimes, but these algorithms may not always work well for systems which are modeled by integrators, such as unloaded turbines. In some implementations, the Ziegler-Nichols algorithm, the Cohen-Coon algorithm, or a combination of these and any other appropriate algorithm for tuning P, I, and/or D gain values may be used by the parameter controller 140.

The P value, which is calculated by the parameter controller 140, is a function of the system gain, relative system gain, the relative system deadtime, the FAST_SLOW input, and whether the system is configured as a P, PI, or PID control (e.g., the P_PI_PID input). The P value is inversely proportional to the system gain. The calculated P value is modified, based on the relative system gain, relative system deadtime and on whether the control is configured to be a P, PI, or PID control. High relative system gains and high relative system deadtimes would decrease the P value. In implementations in which long relative deadtimes are expected, an algorithm similar to the Cohen-Coon algorithm may be used, while other systems may use an algorithm similar to the Ziegler-Nichols algorithm. The FAST_SLOW input provides the user with a gain adjustment for the P value. In various implementations, different equations can be used for a PID control configuration, a PI control configuration, and a P control configuration. PID control configurations will have relatively higher P and I terms than a PI control configuration, which will have a relatively higher P term than a proportional (P) control configuration.

The I and the D values, which are calculated by the parameter controller 140, are a function of the measured system response frequency, the relative system gain, the relative system deadtime, the FAST_SLOW input, and on whether the system is configured as a P, PI, or PID control (e.g., the P_PI_PID input). The calculated I and D values are modified, based on the relative system gain, relative system deadtime, the FAST_SLOW input, and on whether the control is configured to be a P, PI, or PID control. High relative system gains and high relative system deadtimes would increase the calculated I value and decrease the calculated D value. In some implementations in which relatively long deadtimes are expected, an algorithm similar to the Cohen-Coon algorithm can be used, while other systems can use an algorithm similar to the Ziegler-Nichols algorithm. As is typically seen in published literature, a PID control configuration will have relatively higher gain values for the P and I terms than are used a PI control configuration.

When the PID controller 120 is configured with a PI control configuration, the recommended D is set to 0, and the PID controller 120 is configured as a PI control. When the system is PID as a proportional control, the recommended D and I are set to 0, and the PID controller 120 is configured as a proportional control. As seen in the parallel PID equation above, the effect of I and D are also a function of P.

After calculating the new values, the parameter adjustment algorithm 144 performs a step response of the PID controller 120, using newly calculated P, I, and D values, and monitors the response. The P, I, and D values are modified as necessary, based on the system gain, relative system gain, system response, and relative system deadtime, as described above.

At 330 the at least one second control parameter is provided. For example, the parameter controller 140 can provide the collection of control parameters 142 to the PID controller 120 for use as the collection of control parameters 124.

Figure 4:
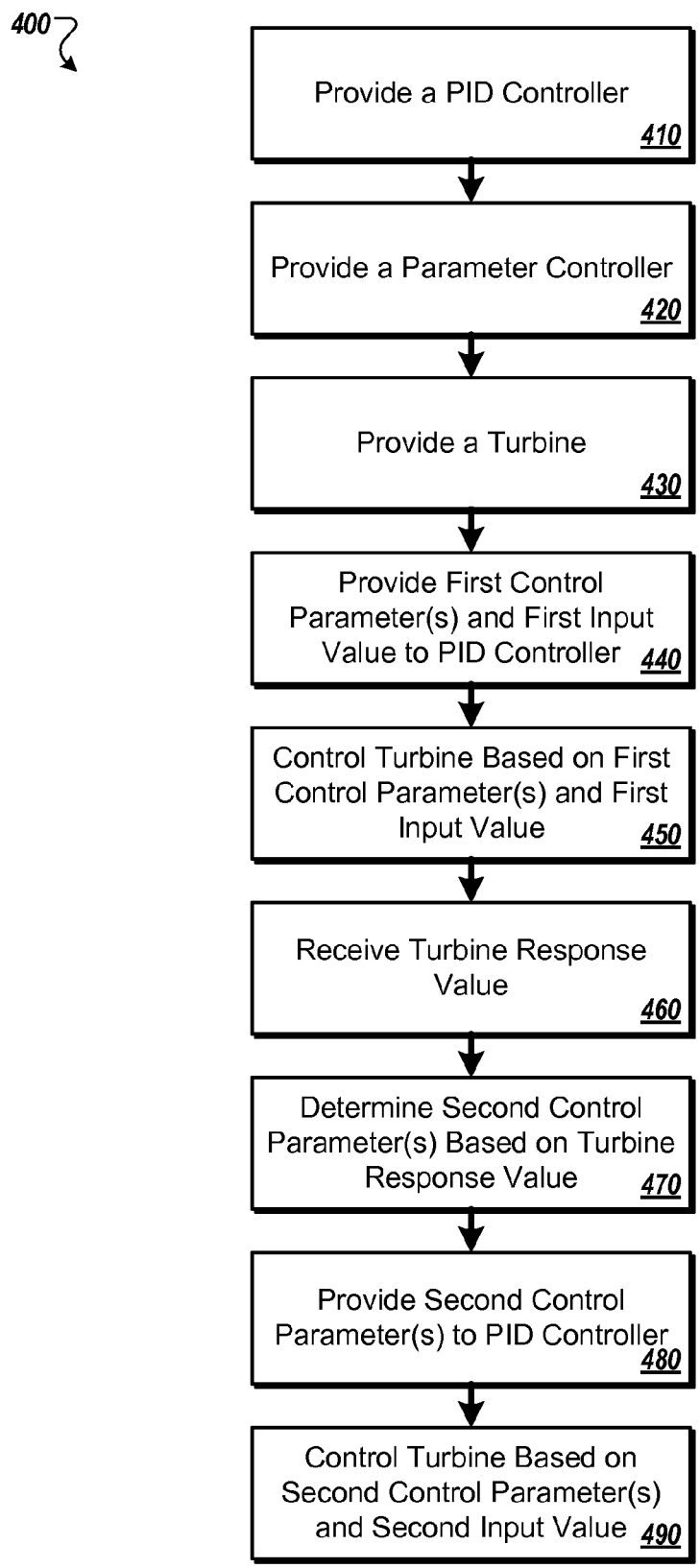
FIG. 4 is flow chart that shows an example of a process for controlling industrial turbines.

FIG. 4 is flow chart that shows an example of a process 400 for controlling industrial turbines. For example the process 400 can be performed by the example system 100 shown in FIG. 1.

At 410 a PID controller is provided. The PID controller is configured to perform a control algorithm based on at least one first control parameter. For example, the PID controller 120 is provided, and the PID controller 120 performs a control algorithm to control the turbine assembly 110. In some implementations, the first input value can be a turbine speed, an outlet temperature, an inlet pressure, and/or an extraction pressure.

At 420, a parameter controller is provided. The parameter controller is configured to perform a parameter adjustment algorithm. For example, the parameter controller 140 is configured to perform the parameter adjustment algorithm 144.

At 430 a turbine is provided. The turbine includes a turbine output sensor in communication with the PID controller and the parameter controller. For example, the turbine 112 has the sensor 130 assembled to it.

At 440 at least one first control parameter and a first input value are provided to the PID controller. For example, the input parameter 122 and the collection of parameters 124 are provided to the PID controller 120. In some implementations, the at least one first control parameter can be the P gain parameter 210, the I gain parameter 220, and/or the SDR parameter 230.

At 450 the PID controller controls the turbine based on the at least one first control parameter and the first input value. For example, the PID controller 120 controls the controllable inputs 114, based on the input parameter 122 and the collection of parameters 124, to control the turbine 112.

At 460 the parameter controller receives a turbine response value provided by the turbine output sensor. For example, the parameter controller 140 receives the feedback signal 132. The feedback signal 132 can be processed to determine one or more values that can describe the response of the turbine 112 to the input parameter 122 and the collection of control parameters 124.

At 470, the parameter controller determines at least one second control parameter based on the turbine response value and the parameter adjustment algorithm. For example, the parameter controller 140 determines the collection of control parameters 142. In some implementations, the collection of control parameters 142 can be different from the collection of control parameters 124. In some implementations, the at least one second control parameter can be the P gain parameter 210, the I gain parameter 220, and/or the SDR parameter 230.

At 480, the at least one second control parameter is provided to the PID controller from the parameter controller. For example, the collection of control parameters 142 can be provided to the PID controller 120 for use as the collection of control parameters 124.

At 490 the turbine is controlled by the PID controller based on the at the least one second control parameter and a second input value. For example, the collection of control parameters 142 can be used by the PID controller 120 as the collection of control parameters 124 for controlling the turbine assembly 110. In some implementations, the second input value can be a turbine speed, an outlet temperature, an inlet pressure, and/or an extraction pressure.

Figure 5:
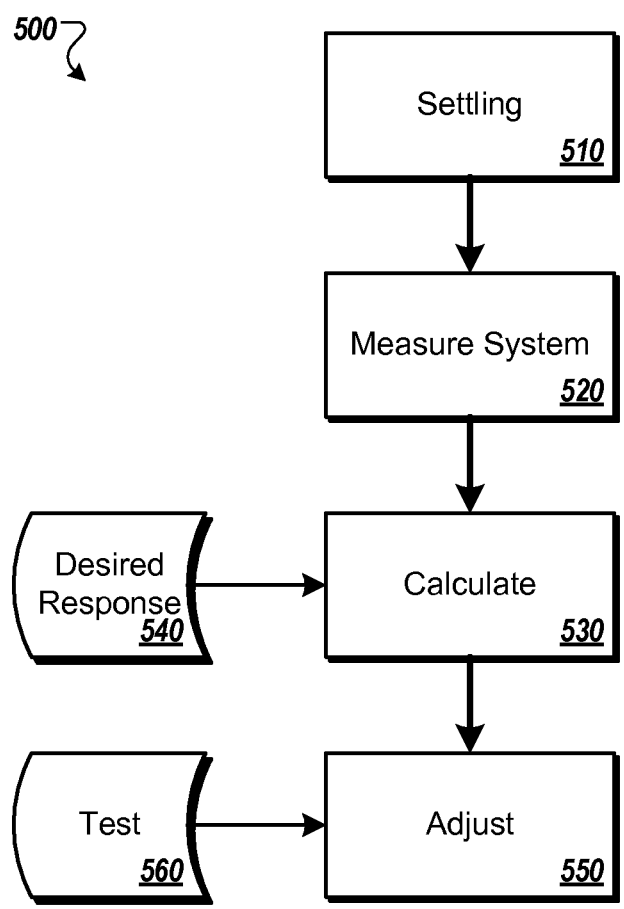
FIG. 5 is flow chart that shows another example of a process for determining PID control parameters.

FIG. 5 is flow chart that shows another example of a process 500 for determining PID control parameters. In some implementations, the process 500 can be performed by the industrial turbine control system 100.

At 510, the system is allowed to settle in to a substantially steady state of operation relative to the input parameter 122. At 520, the output of the system is measured using an algorithm that is configured for the type of turbine in use as the turbine 112. For example the algorithm may be configured differently for a steam turbine, a liquid fueled turbine (e.g., an aircraft turbine), or a gas fueled turbine (e.g., natural gas turbine). In some implementations, the algorithm may be configured differently for different types of control. For example, the algorithm may be configured differently for speed control, load control, temperature control, or for combinations of these or any other controllable outputs of the turbine 112.

At 530, the parameter adjustment algorithm 144 is performed to calculate the collection of control parameters 142 based on the measured system parameters and a desired response input 540. At 550 the calculated collection of control parameters 142 is used in conjunction with a test input 560 to test the collection of control parameters 142 and trigger a further adjustment of the collection of control parameters 142, if needed.

Figure 6:
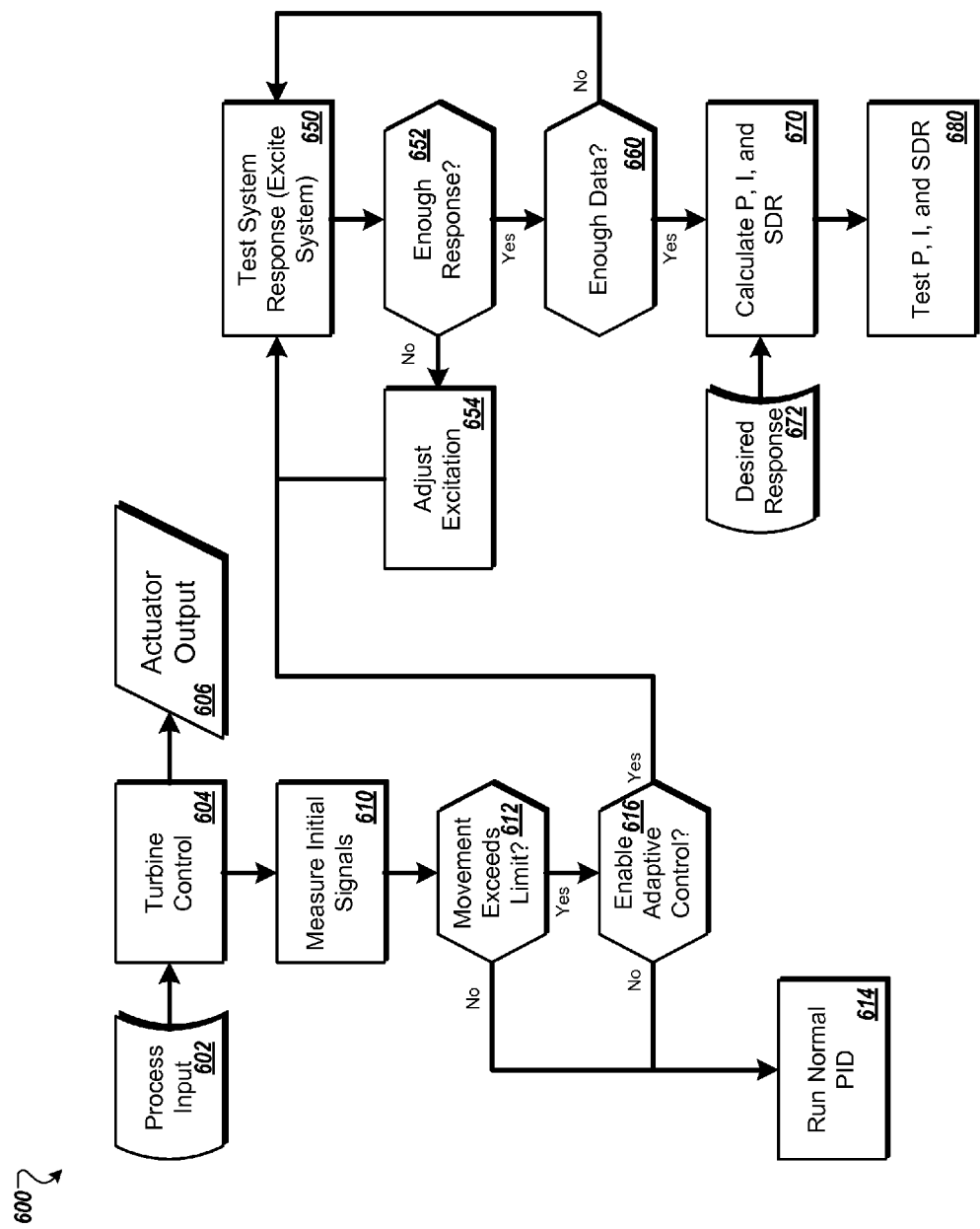
FIG. 6 is flow chart that shows another example of a process for determining PID control parameters.

FIG. 6 is flow chart that shows another example of a process 600 for determining PID control parameters. In some implementations, the process 600 can be performed by the industrial turbine control system 100. In some implementations, the process 500 can be a more detailed embodiment of the process 500 of FIG. 5.

A process input 602 is provided to a turbine control process 604. The turbine control process 604 controls a turbine to provide an actuator output 606. For example, the process input 602 can be a speed parameter, and the turbine control process 604 can be a speed control process for the turbine by actuating a fuel or steam valve as the actuator output 606.

At 610, the initial signals are measured. The initial signals are provided by a feedback sensor that can be used to measure one or more outputs of the turbine. For example, the sensor 130 can provide the feedback signal 132, and the feedback signal 132 can be processed to determine the initial control state.

At 612 a determination is made. If the movement exceeds the user selected movement limit, then a normal PID loop is performed at 614. For example, the parameter controller 140 can determine that the turbine 112 is not operating at steady state, and in response the parameter controller 140 can allow the PID controller 120 to continue to control the turbine assembly 110.

If the system movement is acceptable, at 616 another determination is made. If adaptive control is not enabled, a normal PID loop is performed at 614. If adaptive control is enabled, the system response is tested at 650. For example, the parameter controller 140 can provide a desired output setting as the input parameter 122 to the PID controller 120.

At 652 a determination is made. If an insufficient response is received from the turbine in response to the input parameter, at 654 the excitation (e.g., input parameter 122) is adjusted. If a sufficient response is received from the turbine in response to the input parameter, another determination is made at 660.

If at 660, an insufficient amount of data about the response of the turbine to the input parameter has been received, the system response continues to be tested at 650. If at 660, enough data about the response of the turbine to the input parameter has been received, at 670 the P gain, the I gain, and the SDR gain are calculated based on a desired response 672. At 680, the calculated P, I, and SDR gains are tested. For example, the parameter controller 140 can provide the control parameters 142 to the PID controller 120 for use as the control parameters 124, and the response of the turbine assembly 110 can be evaluated to test the performance of the calculated P, I, and SDR gains for the input parameter 122.

Figure 7:
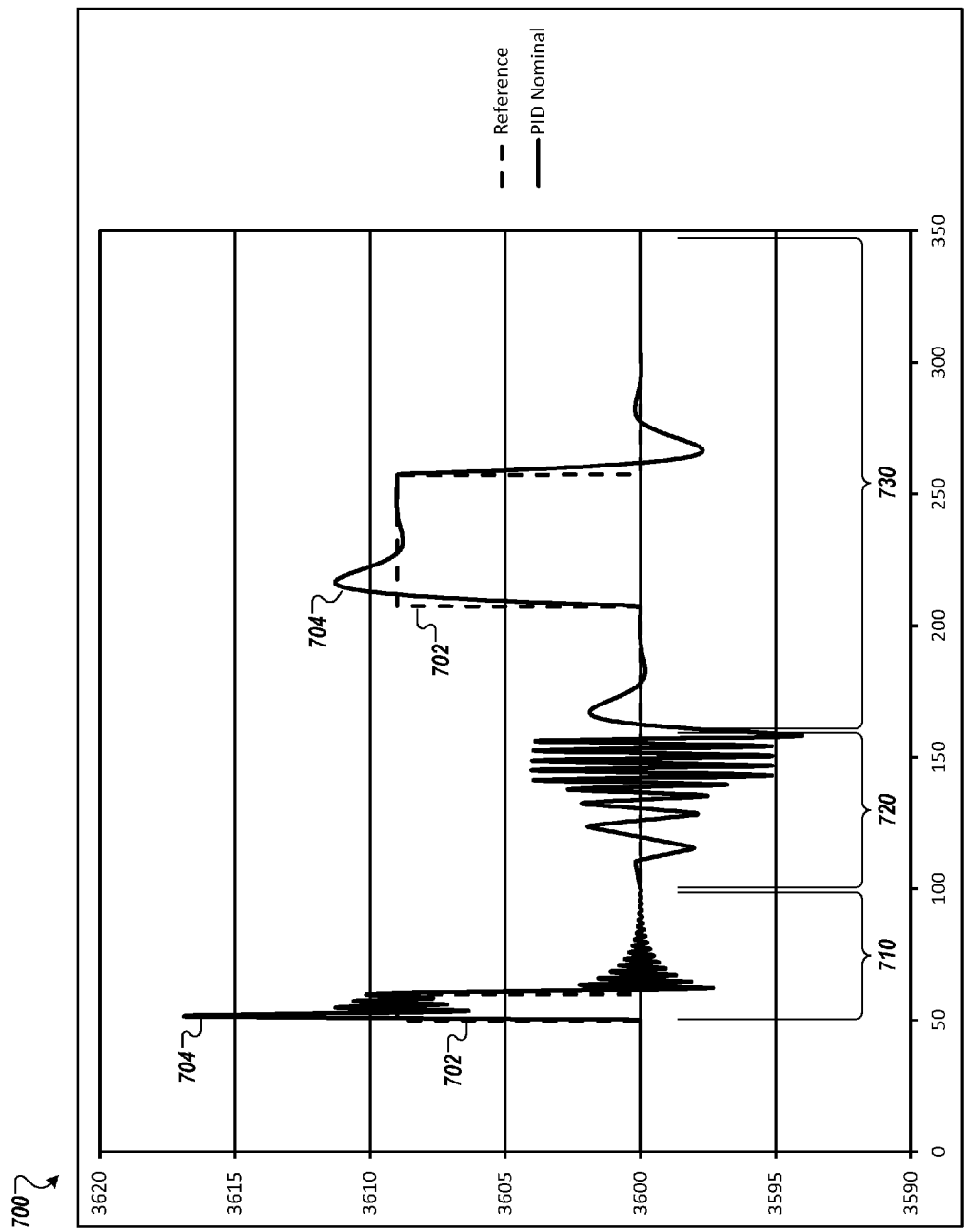
FIG. 7 is a chart showing an example result of tuning an industrial turbine controller having an initially underdamped response.

FIG. 7 is a chart 700 showing an example result of tuning an industrial turbine PID controller controlling a steam turbine off line, pulling a vacuum, with an initially underdamped response. The steam turbine system is modeled with 0.5 Hz actuator with 20 mS deadtime, a control recursion rate of 5 mS, and a turbine with 0.001% damping, running at 3600 RPM, with no load. The desired process movement limit was 0.5%, and the actuator movement was limited to 0.025%. The initial P term was set to 0.0001, the initial I term was set to 0.0001, and SDR was set to 100, denoting a PI controller configuration. The chart 700 represents time (in seconds) along the x-axis, and y-axis represents the measured process output parameter, e.g., rotational speed in RPMs in this example. The chart 700 includes a collection of reference input values 702 and a collection of response output values 704 for an industrial turbine, such as the turbine 112 of the example system shown in FIG. 1. During a time period 710, from about the 50 s mark to about the 100 s mark, the turbine is excited while operating under an initial P gain, I gain, and D gain. The response output values 704 show that the system is marginally stable under the initial collection of gain settings, and exhibits traits indicative of initial gain settings that may be too high.

During a time period 720, from about the 100 s mark to about the 157 s mark, the turbine is perturbed, for example by the parameter controller 140. In some implementations, the system gain and relative system gain can be determined by measuring the ratio of process movement, to output demand movement. The system response frequency can be determined by measuring the frequency of the process response. The relative system deadtime can be determined by measuring the delay between the movement of the output demand, and the process movement. As seen by the system settings above, and the plots, the system deadtime is minimal. These parameters can be used to determine updated P, I, and D gain values, as explained above. The updated P, I, and SDR gain values, are 0.0015, 0.21, and 6.85, respectively. The corresponding D value would be 0.69. Those updated P, I, and D gains are then provided to the PID controller for use in the control of the turbine.

During a time period 730, from about the 157 s mark onward, the turbine is controlled using the updated P, I, and D gains. The response of the system during the time period 730 (e.g., after adjustment by the parameter controller 140) is more stable than the system's response during the time period 710 (e.g., prior to adjustment by the parameter controller 140).

Figure 8:
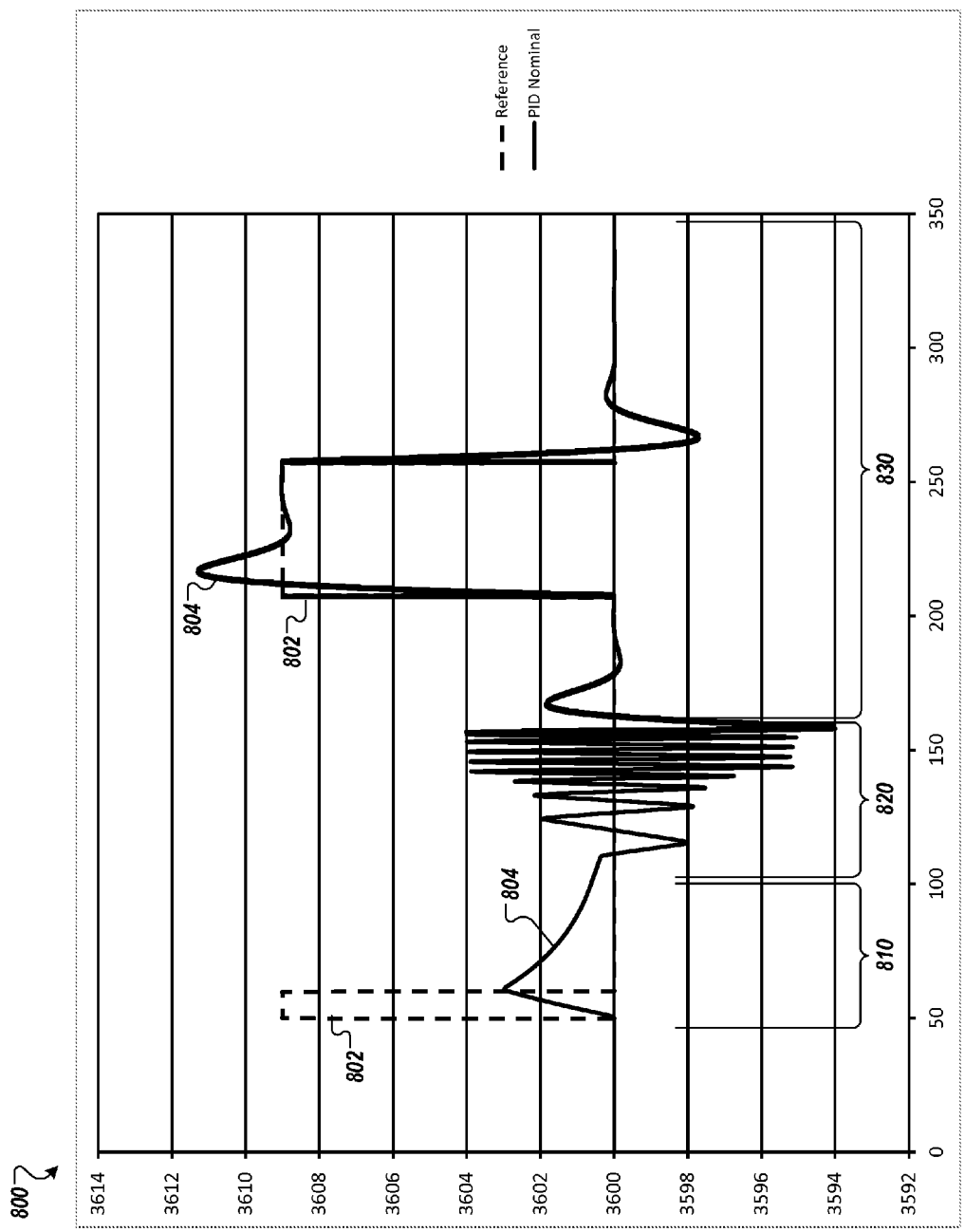
FIG. 8 is a chart showing an example result of tuning an industrial turbine controller having an initially overdamped response.

FIG. 8 is a chart 800 showing an example result of tuning an industrial turbine PID controller controlling a steam turbine, off line, pulling a vacuum, with an initially overdamped response. Again, the steam turbine system is modeled with 0.5 Hz actuator with 20 mS deadtime, a control recursion rate of 5 mS, and a turbine with 0.001% damping, running at 3600 RPM, with no load. The desired process movement limit was 0.5%, and the actuator movement was limited to 0.025%. The initial P term was set to 0.01, the initial I term was set to 0.01, and SDR was set to 100, denoting a PI controller configuration. The chart 800 represents time (in seconds) along the x-axis, and y-axis represents the measured process output parameter, e.g., rotational speed in RPMs in this example. The chart 800 includes a collection of reference input values 802 and a collection of response output values 804 for an industrial turbine, such as the turbine 112 of the example system shown in FIG. 1. During a time period 810, from about the 50 s mark to about the 100 s mark, the turbine is excited while operating under an initial P gain, I gain, and D gain.

The response output values 804 show that the system is overdamped (e.g., sluggish response) and did not reach the setpoint during the given time period 810. Such behavior can be indicative of initial gain settings that may be too low.

During a time period 820, from about the 100 s mark to about the 157 s mark, the turbine is perturbed, for example by the parameter controller 140, and the response of the turbine is processed. In some implementations, the system gain and relative system gain can be determined by measuring the ratio of process movement, to output demand movement. The system response frequency can be determined by measuring the frequency of the process response. The relative system deadtime can be determined by measuring the delay between the movement of the output demand, and the process movement. These parameters are used to determine updated P, I, and D gain values, as explained above. Those updated P, I, and D gains are then provided to the PID controller for use in the control of the turbine.

During a time period 830, from about the 157 s mark onward, the turbine is controlled using the updated P, I, and SDR gains, of 0.0015, 0.21, and 6.85, respectively. The response of the system during the time period 830 (e.g., after adjustment by the parameter controller 140) is more responsive than the system's response during the time period 810 (e.g., prior to adjustment by the parameter controller 140). Note that FIGS. 7 and 8 show repeatable P, I, and D terms, as well as repeatable responses for each of the tuning sequences with good performance and good margin (fast response, minimal ringing), regardless of the initial values used by the PID controller 120 and the initial response of the PID controller 120 and the turbine assembly 110. The parameter controller 140 can work as well with a system that is initially sluggish, overdamped, and unresponsive, as with a system which is marginally stable and ringing.

Figure 9:
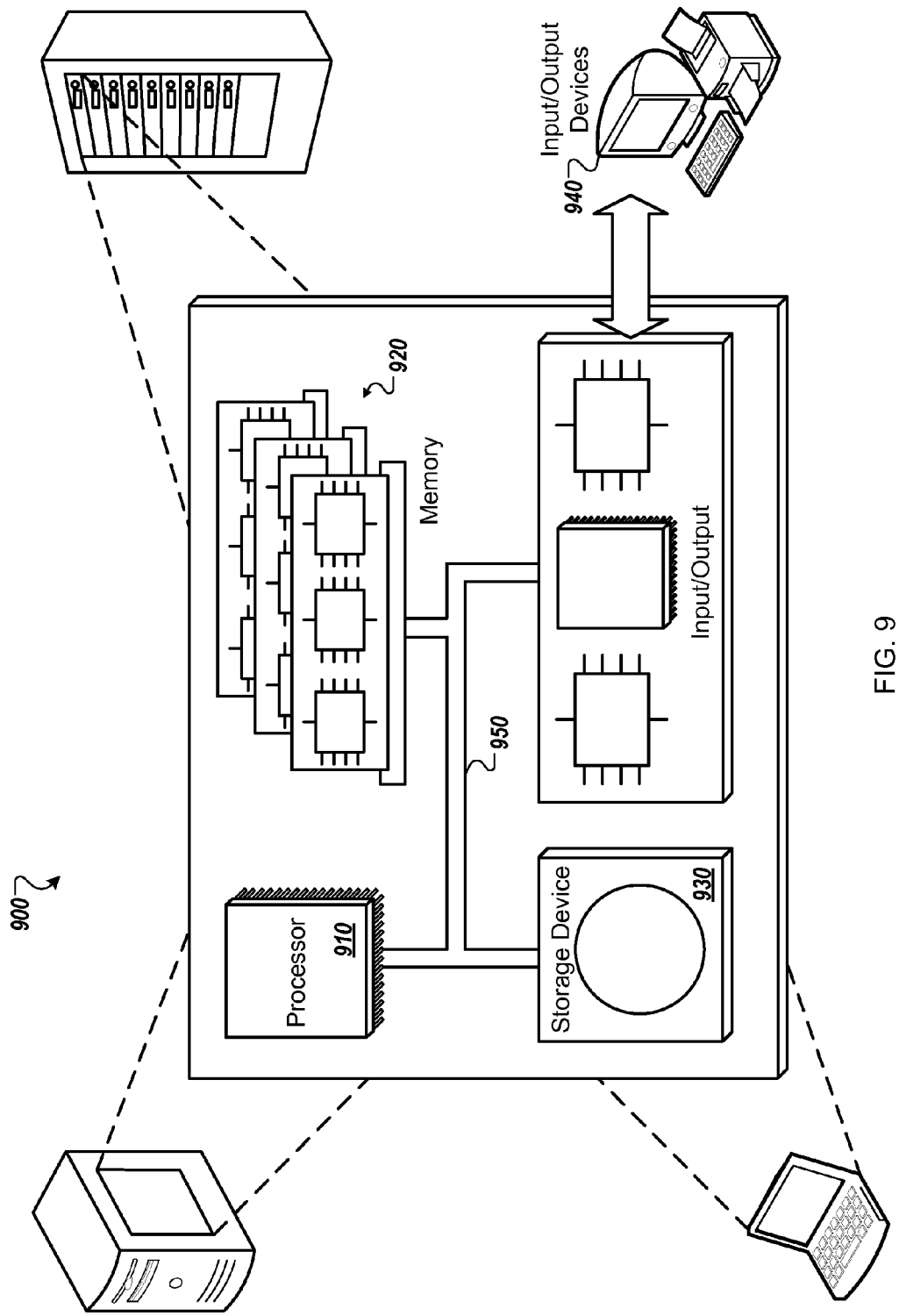
FIG. 9 is a schematic diagram of an example of a generic computer system.

FIG. 9 is a schematic diagram of an example of a generic computer system 900. The system 900 can be used for the operations described in association with the process 300 according to one implementation. For example, the system 900 may be included in either or all of the parameter controller 140 and/or the PID controller 120 of FIG. 1.

The system 900 includes a processor 910, a memory 920, a storage device 930, and an input/output device 940. Each of the components 910, 920, 930, and 940 are interconnected using a system bus 950. The processor 910 is capable of processing instructions for execution within the system 900. In one implementation, the processor 910 is a single-threaded processor. In another implementation, the processor 910 is a multi-threaded processor. The processor 910 is capable of processing instructions stored in the memory 920 or on the storage device 930 to display graphical information for a user interface on the input/output device 940.

The memory 920 stores information within the system 900. In one implementation, the memory 920 is a computer-readable medium. In one implementation, the memory 920 is a volatile memory unit. In another implementation, the memory 920 is a non-volatile memory unit.

The storage device 930 is capable of providing mass storage for the system 900. In one implementation, the storage device 930 is a computer-readable medium. In various different implementations, the storage device 930 may be a floppy disk device, a hard disk device, an optical disk device, or a tape device.

The input/output device 940 provides input/output operations for the system 900. In one implementation, the input/output device 940 includes a keyboard and/or pointing device. In another implementation, the input/output device 940 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method for operating a turbine comprising:
providing a process controller configured to perform a control algorithm based on at least one first control parameter representing a first value selected from a group comprising a proportional gain (P) value, an integral gain (I) value, and a derivative gain (D) value, the control algorithm is given by the equation: $H(s)=P(1+I/s)(Ds+1)$, wherein s is the Laplace operator;
providing a parameter controller configured to perform a parameter adjustment algorithm;
providing a turbine having assembled thereto a turbine output sensor in communication with the process controller and the parameter controller;
providing, to the process controller, at least one first control parameter and a first input value;
controlling, by the process controller, the turbine based on the at least one first control parameter and the first input value;
receiving, by the parameter controller, a turbine response value provided by the turbine output sensor;
determining, by the parameter controller, at least one second control parameter based on the turbine response value and the parameter adjustment algorithm, the second control parameter representing a second value selected from the group;
providing, to the process controller from the parameter controller, the at least one second control parameter;
and controlling, by the process controller, the turbine based on the at least one second control parameter and a second input value.

2. The method of claim 1, further comprising identifying, by the parameter controller, the turbine response value provided by the turbine output sensor.

3. The method of claim 1, wherein at least one of the first input value and the second input value is a value selected from the group consisting of turbine speed, load, temperature, flow, current, voltage, pressure, and vibration.

4. The method of claim 1, wherein the P value is a function of a relative system gain, a relative system deadtime, and a response speed input parameter.

5. The method of claim 1, wherein at least one of the I value and the D value is a function of a measured system response frequency, a relative system gain, a relative system deadtime, and a response speed input parameter.

6. A method for operating a turbine comprising:
receiving, at a parameter controller, a turbine response value, the turbine response value based on an input value and at least one first control parameter representing a first value selected from a group comprising a proportional gain (P) value, an integral gain (I) value, and a derivative gain (D) value;

providing a process controller configured to perform a control algorithm based on at least one first control parameter, the control algorithm given by the equation:

$$H(s) = P\left(1 + \frac{I}{S}\right)(Ds + 1),$$

wherein s is the Laplace operator;
determining, by the parameter controller, at least one second control parameter based on the turbine response value and a parameter adjustment algorithm, the second control parameter representing a second value selected from the group; and
providing, by the parameter controller, the at least one second control parameter.

7. The method of claim 6, further comprising providing the parameter controller configured to perform the parameter adjustment algorithm.

8. The method of claim 6, further comprising providing a turbine having assembled thereto a turbine output sensor configured to provide the turbine response value.

9. The method of claim 6, wherein the at least one first control parameter, the at least one second control parameter, and the input value are PID process controller values.

10. The method of claim 6, wherein the turbine response value comprises one or more turbine output values provided by a turbine output sensor.

11. The method of claim 6, wherein the turbine response value is based on an output response of a turbine under the control of the process controller configured with the at least one first control parameter and the input value.

12. The method of claim 6, further comprising identifying, by the parameter controller, the turbine response value provided by a turbine output sensor.

13. The method of claim 6, wherein the input value is a value selected from the group consisting of turbine speed, load, temperature, flow, current, voltage, pressure, and vibration.

14. The method of claim 6, wherein the P value is a function of a relative system gain, a relative system deadtime, and a response speed input parameter.

15. The method of claim 6, wherein at least one of the I value and the D value is a function of a measured system response frequency, a relative system gain, a relative system deadtime, and a response speed input parameter.

16. A turbine parameter controller comprising:
an input;
an output;
memory storing instructions that are executable; and
one or more processing devices to execute the instructions to perform operations comprising:
receiving a turbine response value at the input, the turbine response value based on an input value and at least one first control parameter representing a first value selected from a group comprising a proportional gain (P) value, an integral gain (I) value, and a derivative gain (D) value;
determining at least one second control parameter based on the turbine response value and a parameter adjustment algorithm, the second control parameter representing a second value selected from the group, wherein the at least one second control parameter is provided to a process controller configured to perform a control algorithm given by the equation:

$$H(s) = P\left(1 + \frac{I}{S}\right)(Ds + 1),$$

wherein s is the Laplace operator;
providing the at least one second control parameter at the output.

17. The controller of claim 16, wherein the at least one first control parameter, the at least one second control parameter and the input value are PID process controller values.

18. The controller of claim 16, wherein the turbine response value comprises one or more turbine output values provided by a turbine output sensor.

19. The method of claim 16, wherein the turbine response value is based on an output response of a turbine under the control of the process controller configured with the at least one first control parameter and the input value.

20. The controller of claim 16, further comprising identifying the turbine response value provided by a turbine output sensor.

21. The controller of claim 16, wherein the input value is a value selected from the group comprising: turbine speed, load, temperature, flow, current, voltage, pressure, and vibration.

22. The controller of claim 16, wherein the P value is a function of a relative system gain, a relative system deadtime, and a response speed input parameter.

23. The controller of claim 16, wherein at least one of the I value and the D value is a function of a measured system response frequency, a relative system gain, a relative system deadtime, and a response speed input parameter.

24. A turbine system comprising:
a process controller configured to perform a control algorithm based on at least one first control parameter representing a first value selected from a group comprising a proportional gain (P) value, an integral gain (I) value, and a derivative gain (D) value, the control algorithm is given by the equation: $H(s)=P(1+I/s)(Ds+1)$, wherein s is the Laplace operator;
a parameter controller configured to perform a parameter adjustment algorithm;
a turbine having assembled thereto a turbine output sensor in communication with the process controller and the parameter controller;
wherein the parameter adjustment algorithm is configured to perform operations comprising:
providing, to the process controller, at least one first control parameter and a first input value;
controlling, by the process controller, the turbine based on the at least one first control parameter and the first input value;
receiving, by the parameter controller, a turbine response value provided by the turbine output sensor;
determining, by the parameter controller, at least one second control parameter based on the turbine response value and the parameter adjustment algorithm, the second control parameter representing a second value selected from the group;
providing, to the process controller from the parameter controller, the at least one second control parameter; and
controlling, by the process controller, the turbine based on the at least one second control parameter and a second input value.

25. The system of claim 24, further comprising identifying, by the parameter controller, the turbine response value provided by the turbine output sensor.

26. The system of claim 24, wherein at least one of the first input value and the second input value is a value selected from the group comprising: turbine speed, load, temperature, flow, current, voltage, pressure, and vibration.

27. The system of claim 24, wherein the P value is a function of a relative system gain, a relative system deadtime, and a response speed input parameter.

28. The system of claim 24, wherein at least one of the I value and the D value is a function of a measured system response frequency, a relative system gain, a relative system deadtime, and a response speed input parameter.

29. A non-transitory computer readable medium storing instructions that, when executed by one or more processors, cause the one or more processors to perform operations comprising:
receiving, at a parameter controller, a turbine response value, the turbine response value based on an input value and at least one first control parameter representing a first value selected from a group comprising a proportional gain (P) value, an integral gain (I) value, and a derivative gain (D) value;
providing a process controller configured to perform a control algorithm based on at least one first control parameter, the control algorithm given by the equation:

$$H(s) = P\left(1 + \frac{I}{S}\right)(Ds + 1),$$

wherein s is the Laplace operator;
determining, by the parameter controller, at least one second control parameter based on the turbine response value and a parameter adjustment algorithm, the second control parameter representing a second value selected from the group;
and providing, by the parameter controller, the at least one second control parameter.

30. The non-transitory computer readable medium of claim 29, further comprising providing the parameter controller configured to perform the parameter adjustment algorithm.

31. The non-transitory computer readable medium of claim 29, further comprising providing a turbine having assembled thereto a turbine output sensor configured to provide the turbine response value.

32. The non-transitory computer readable medium of claim 29, wherein the at least one first control parameter, the at least one second control parameter, and the input value are PID process controller values.

33. The non-transitory computer readable medium of claim 29, wherein the turbine response value comprises one or more turbine output values provided by a turbine output sensor.

34. The non-transitory computer readable medium of claim 29,
wherein the turbine response value is based on an output response of a turbine under the control of the process controller configured with the at least one first control parameter and the input value.

35. The non-transitory computer readable medium of claim 29, further comprising identifying, by the parameter controller, the turbine response value provided by a turbine output sensor.

36. The non-transitory computer readable medium of claim 29, wherein the input value is a value selected from the group consisting of turbine speed, load, temperature, flow, current, voltage, pressure, and vibration.

37. The non-transitory computer readable medium of claim 29, wherein the P value is a function of a relative system gain, a relative system deadtime, and a response speed input parameter.

38. The non-transitory computer readable medium of claim 29, wherein at least one of the I value and the D value is a function of a measured system response frequency, a relative system gain, a relative system deadtime, and a response speed input parameter.

* * * * *

UNITED STATES PATENT AND TRADEMARK OFFICE
CERTIFICATE OF CORRECTION

Page 1 of 1

PATENT NO. : 9,507,365 B2
APPLICATION NO. : 14/313604
DATED : November 29, 2016
INVENTOR(S) : Tena K. Britt It is certified that error appears in the above-identified patent and that said Letters Patent is hereby corrected as shown below:

In the Specification

Column 2, Line 1, replace "$H(s)=P(1-1/s)(Ds+1)$." with -- $H(s)=P(1+1/s)(Ds+1)$. --

Column 8, Line 12, replace "Out"in" with -- "Out" in --

In the Claims

Column 18, Line 5, after "operator;" insert -- and --

Column 18, Line 16, replace "method" with -- controller --

Signed and Sealed this
Eighteenth Day of April, 2017

Michelle K. Lee
*Director of the United States Patent and Trademark Office*